Sept. 2, 1958 W. W. PRICKETT ET AL 2,849,944
CAN RETORT

Filed Oct. 19, 1953 5 Sheets-Sheet 1

Wilber W. Prickett
Mona E. Prickett
INVENTORS.

BY
Attorneys

Sept. 2, 1958  W. W. PRICKETT ET AL  2,849,944
CAN RETORT
Filed Oct. 19, 1953  5 Sheets-Sheet 2
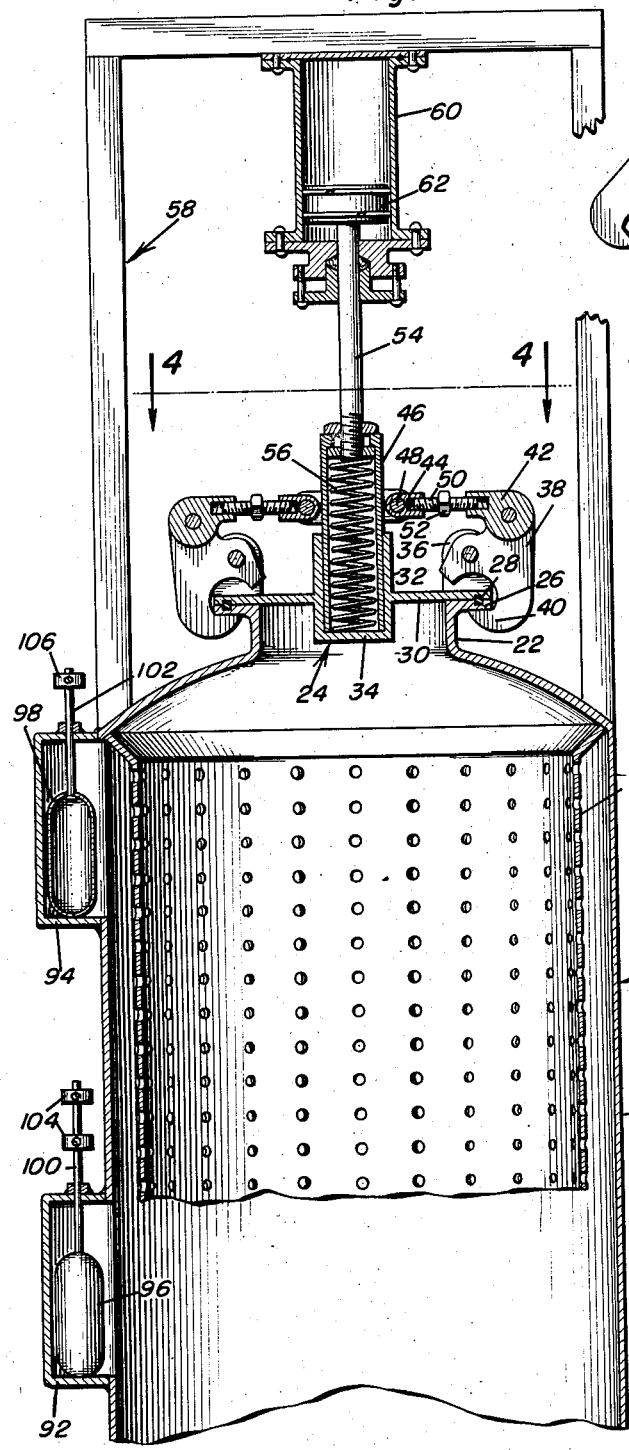
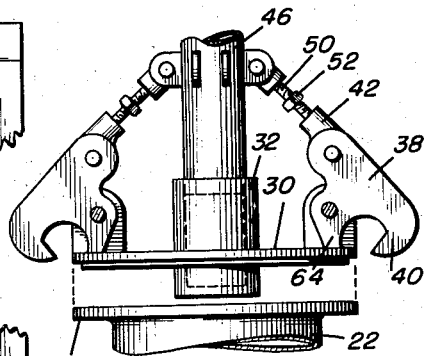
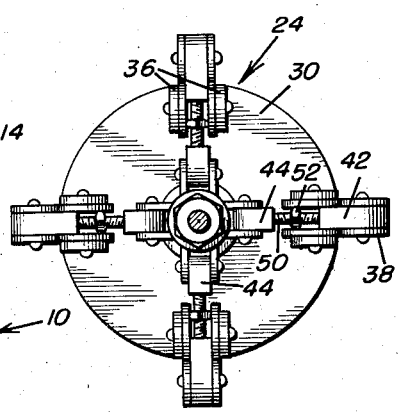
Wilber W. Prickett
Mona E. Prickett
INVENTORS.

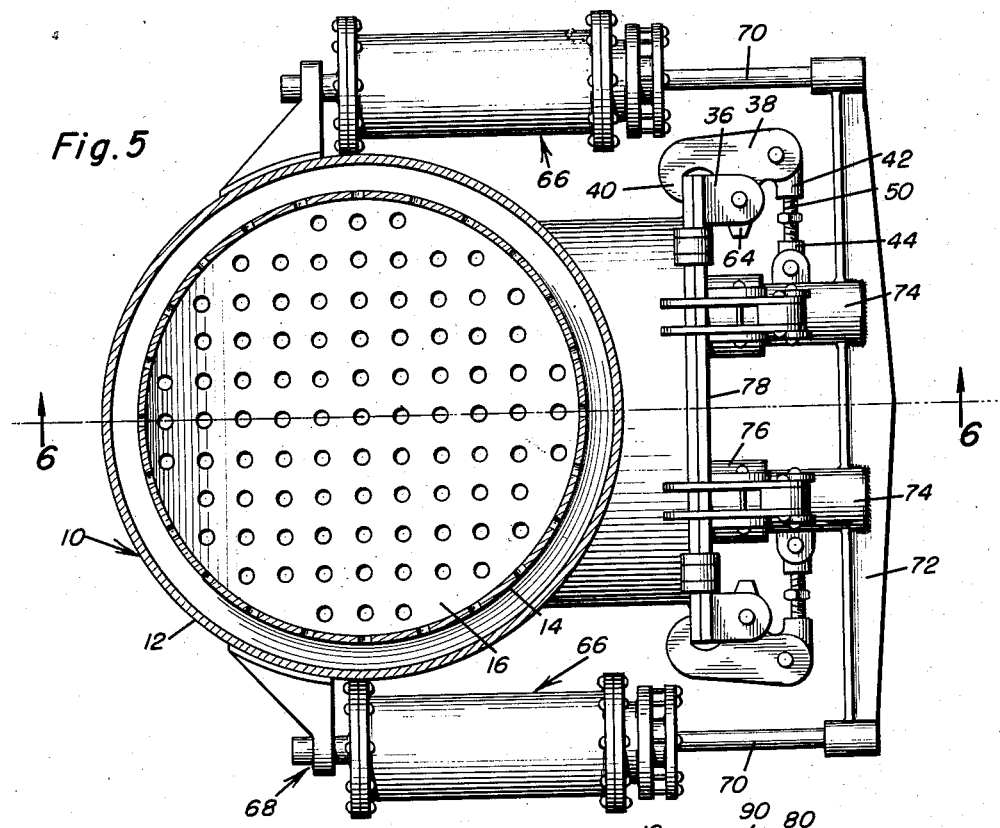
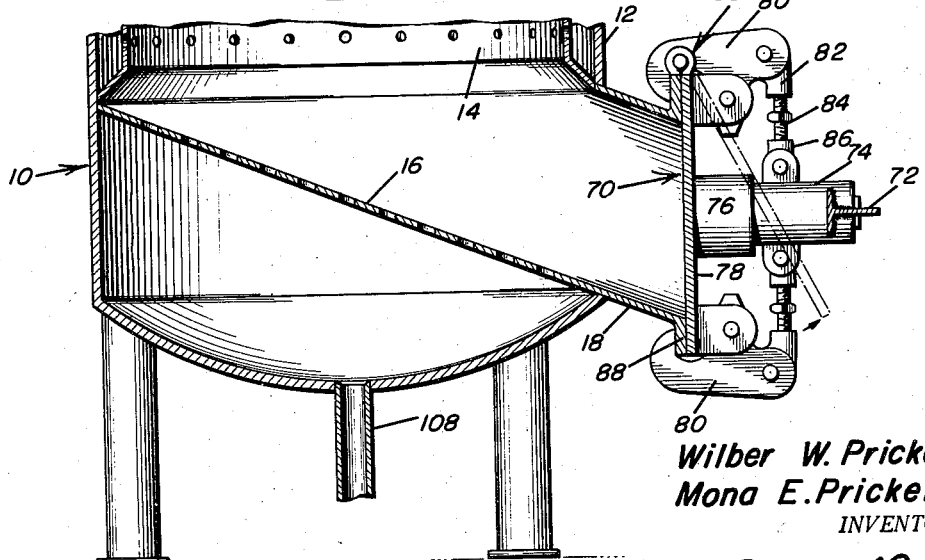

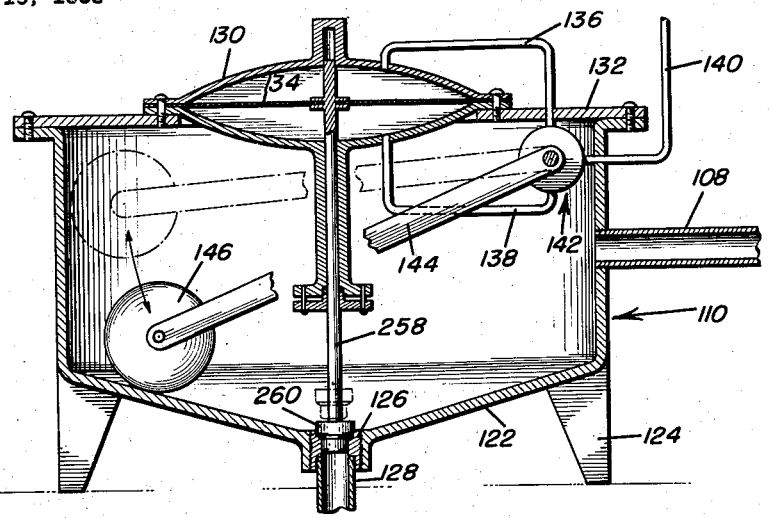
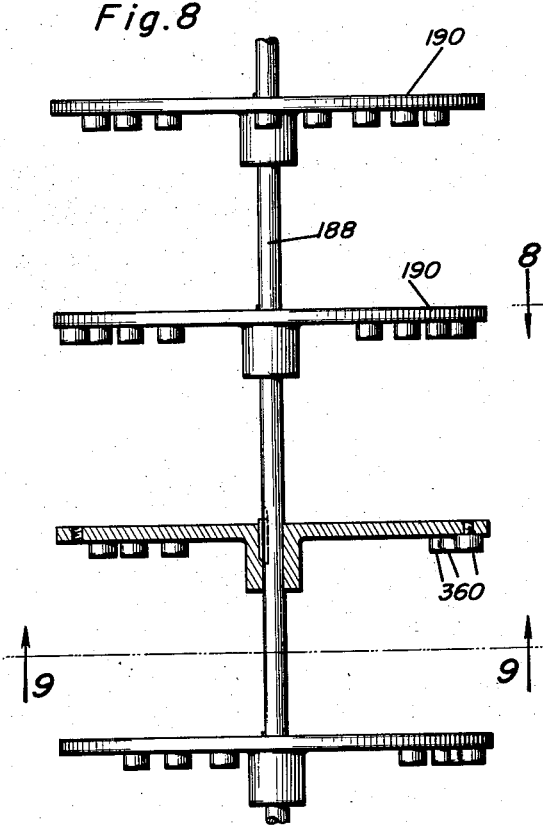
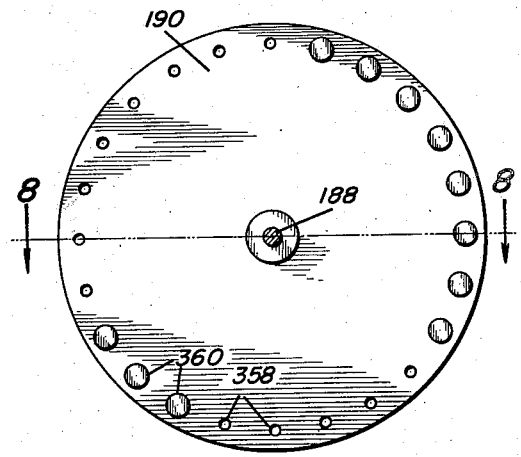

Sept. 2, 1958  W. W. PRICKETT ET AL  2,849,944
CAN RETORT
Filed Oct. 19, 1953  5 Sheets-Sheet 5
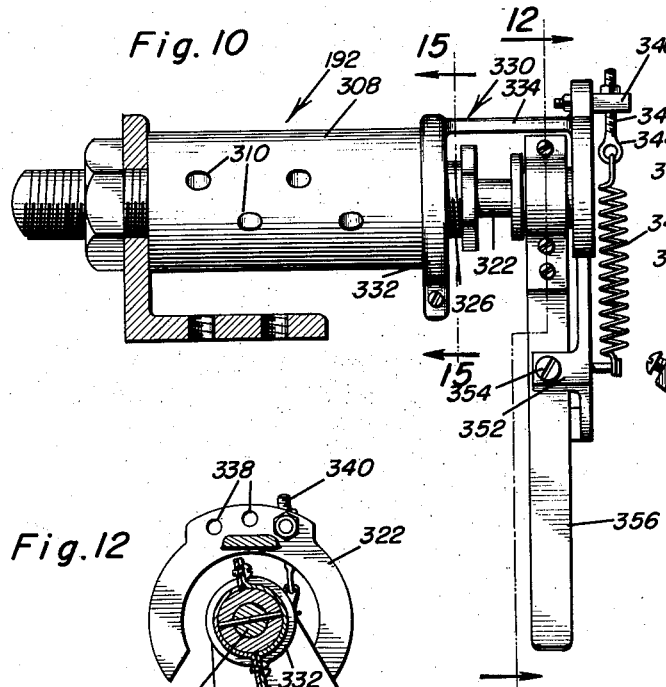
Fig. 10
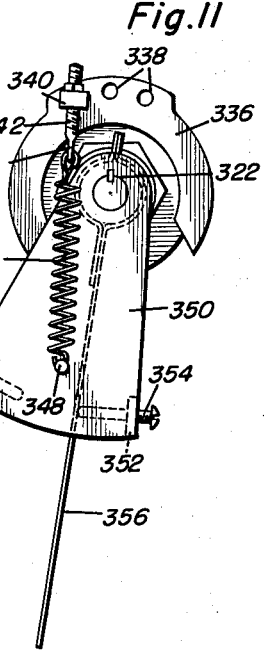
Fig. 11
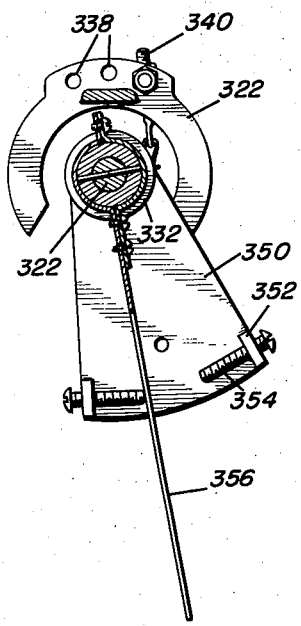
Fig. 12
Fig. 15
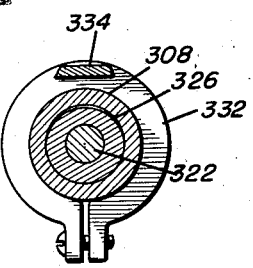
Fig. 14
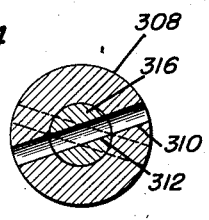
Fig. 13
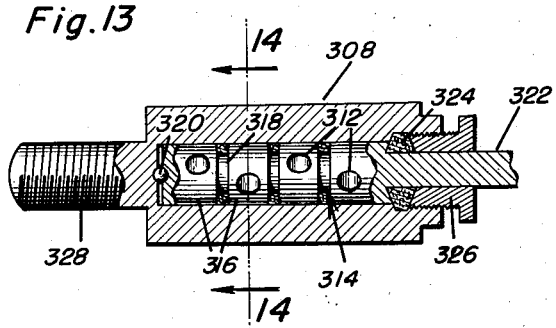
Wilber W. Prickett
Mona E. Prickett
INVENTORS.
BY *Clarence A. O'Brien*
*and Harvey B. Jacobson*
Attorneys

United States Patent Office 2,849,944
Patented Sept. 2, 1958

2,849,944

CAN RETORT

Wilber W. Prickett and Mona E. Prickett, Ponce, Puerto Rico

Application October 19, 1953, Serial No. 386,829

2 Claims. (Cl. 99—330)

This invention relates generally to can retorts, and pertains more particularly to improved control systems therefor.

A primary object of this invention is to provide control mechanism in conjunction with an improved can retort to provide a wholly automatic operation, the cycle of operation including charging the retort, cooking the product and ejecting the product.

Another object of this invention is to provide improved apparatus and system for cooking canned goods wherein the various steps in the method are under positive automatic control and are initiated in automatically timed sequence as dictated by a novel timing assembly.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2 is a vertical section taken substantially along the plane of section line 2—2 in Figure 1;

Figure 3 is an elevational view showing the top door construction;

Figure 4 is a plan view of the assembly shown in Figure 3;

Figure 5 is a horizontal section taken substantially along the plane of section line 5—5 in Figure 1 showing details of the lower door construction;

Figure 6 is a vertical section taken substantially along the plane of section line 6—6 of Figure 5;

Figure 7 is a vertical section taken through the trap assembly;

Figure 8 is a plan view partly in section showing a portion of the cam mechanism;

Figure 9 is a transverse section taken substantially along the plane of section line 9—9 in Figure 8;

Figure 10 is an elevational view partly in section showing details of one of the valve mechanisms;

Figure 11 is an end view of the assembly shown in Figure 10;

Figure 12 is a transverse section taken substantially along the plane of section line 12—12 in Figure 10;

Figure 13 is a longitudinal section taken through one of the valve assemblies;

Figure 14 is a transverse section taken substantially along the plane of section line 14—14 in Figure 13; and Figure 15 is a transverse section taken substantially along the plane of section line 15—15 in Figure 10.

Figure 1:
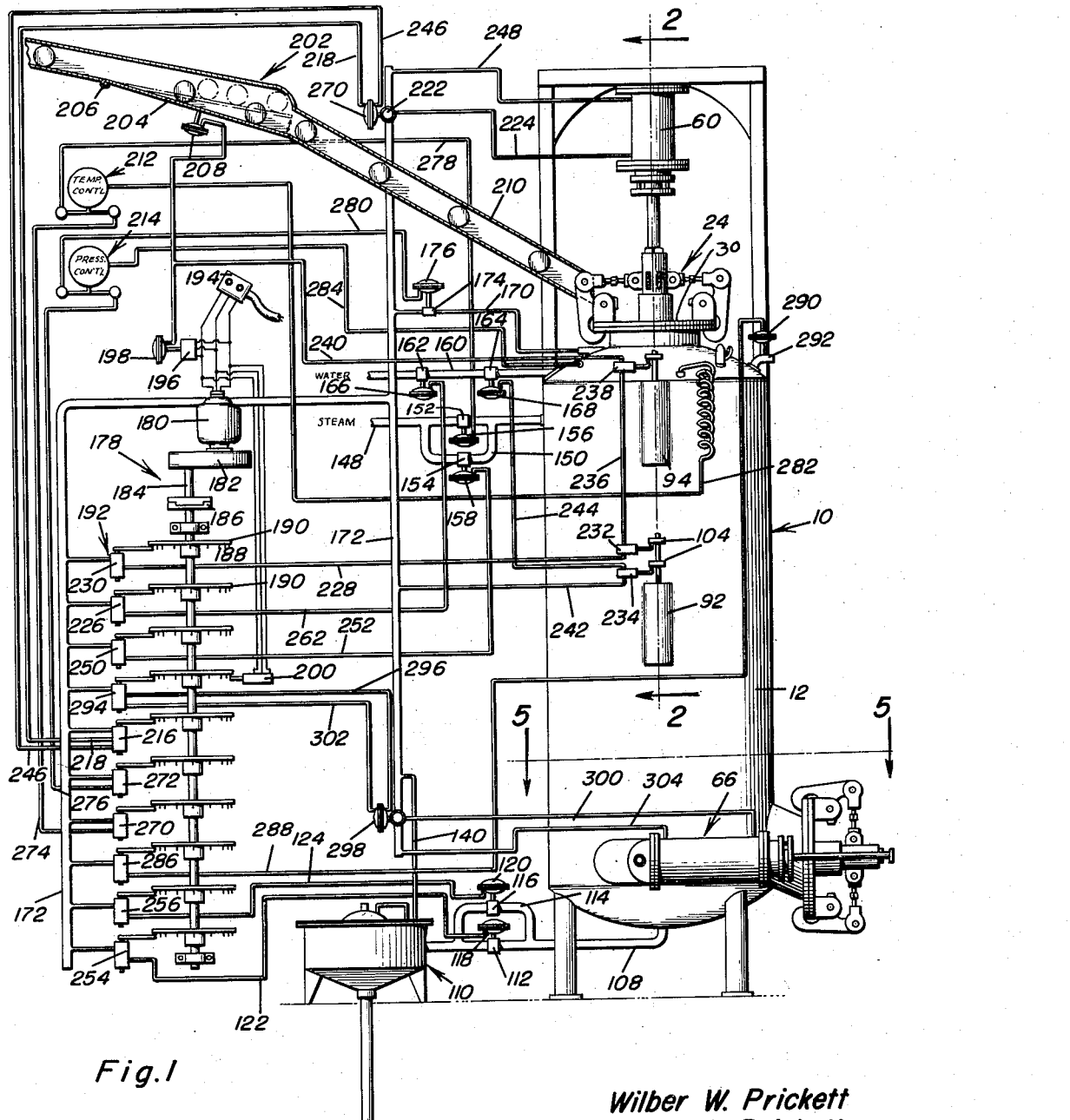
Figure 1 is an elevational view of the retort and associated control mechanism.

Referring now more particularly to the drawings, the reference numeral 10 indicates the can retort generally which, it will be noted, is of generally cylindrical configuration and which incorporates an outer imperforate casing 12 and an inner perforate casing 14, these two casings being suitably secured together. The outer casing constitutes the cover or housing for the retort and it will be noted that the inner casing 14 is provided with an open upper end while its lower end is provided with a perforate bottom wall 16 as will be seen most clearly in Figure 5. The bottom wall 16 may actually be formed separate from the inner casings 14, it being merely necessary that this bottom wall provide an inclined apron leading through an opening in the bottom of the outer casing 12 to terminate in a cylindrical neck portion 18 with which the door assembly, indicated generally by the reference character 20, is associated.

As seen most clearly in Figure 2, the upper end of the outer casing 12 is provided with a neck 22 defining an opening which is selectively closed by the door assembly indicated generally by the reference character 24. The upper end of this neck is flanged as at 26 and is provided with an annular gasket member 28 for sealingly engaging with the door plate 30, this upper door plate being provided with a central boss 32 which is open at its upper end and is provided with a bottom wall 34, in the manner shown. Pairs of bracket ears 36 are peripherally arranged on the upper surface of the door plate 30, in the manner shown most clearly in Figure 4 and pivotally secured between each pair of ears is a latching hook 83 having a hook end portion 40 for engaging under the flange 26 and sealingly engaging the door plate 30 with such flange. Socket members 42 are pivotally secured to the upper ends of the latching hooks and these members are connected to further socket members 44 carried by the sleeve 46 as by the pin members 48 through the medium of the stud members 50 provided medially thereof with wrench-receiving portions 52, it being noted that the opposite end portions of these studs are oppositely threaded for adjusting the proper position of the latching hooks 38. The sleeve 46 is suitably secured to a connecting rod 54 at its upper end and its lower end is slidably received in the boss member 32 in the manner shown, the sleeve also housing a compression spring member 56 for normally urging the sleeve outwardly of the boss 32. A suitable frame 58 is secured to the retort and carries a cylinder member 60 within which the piston member 62 is reciprocable, the piston being, of course, secured to the upper end of the connecting rod 54 as is evident.

It will be manifest that as the piston 62 is reciprocated upwardly in the cylinder 60 from the lower position, as shown in Figure 2, to an upper position, as shown in Figure 3, the sleeve 46 will slide outwardly of the boss member 32 until such time as the abutment projection 64 on the latching hooks 38 engage the upper surface of the door plate 30 whereupon further upward movement of the piston will raise the door plate away from the retort neck 22, in the manner shown.

Referring now more particularly to Figures 5 and 6, it will be seen that a similar method is employed for opening the bottom door assembly 20 previously mentioned, with the exception that the cylinder assemblies 66 are pivotally secured to the outer casing about a horizontal axis, as indicated by the reference character 68, the connecting rod 70 of these assemblies being connected to the beam member 72, secured to the sleeve 74 provided in sliding engagement with the boss member 76 of the door plate 78. Latching hooks or dogs 80 similar to those previously described are operatively associated with the sleeve members to the connecting link members 82, 84 and 86 corresponding to the previously described members 42, 50 and 44 respectively. However, the door plate 78 is pivotally secured to the neck flange 88 by a suitable hinge mechanism indicated by the reference character 90 such that the door is movable between the forward dotted line positions, as shown in Figure 6. During this movement it is manifest that the pivotal connection 68 between the cylinder assemblies and the retort will permit the necessary motion of the beam member 72.

The outer casing 12 is provided with a pair of vertically spaced, radially projecting chamber portions 92 and 94 housing the lower and upper float members 96 and 98 respectively, each of which are provided with the operating plungers 100 and 102 respectively, the former of which is provided with a pair of vertically spaced actuating ears 104 and the latter of which is provided with a single actuating ear 106, the purpose of these ears being presently apparent.

The lowermost portion of the outer casing 12 is provided with a drain conduit 108 leading to the trap assembly, indicated generally by the reference character 110, this conduit having a control valve 112 therein and a bypass line 114 around this valve which is in itself provided with a further control valve 116. The valves 112 and 116 are provided with actuating members 118 and 120 respectively connected respectively to the air lines 122 and 124 for a purpose presently apparent and in a manner hereinafter set forth.

As seen most clearly in Figure 7, the trap assembly 110 comprises a casing 122 which may be provided with suitable leg members 124 and whose bottom wall is dished in the manner shown and provided with a central threaded aperture into which a bushing member 126 is engaged. The bushing may be connected to a suitable external drain line 128 leading to any convenient discharge point. An air motor 130 is incorporated on the removable top cover 132 of the trap assembly and it will be noted that this motor comprises a cylinder arrangement having a diaphragm 134 secured thereto and separating its interior into two separate chambers which are respectively connected to the air lines 136 and 138 respectively. An air supply line 140 leads to the valve assembly 142 which incorporates a movable core member to which the arm 144 is connected, the free end of the arm being provided with a float member 146, in the manner shown. The purpose and operation of this trap assembly will be presently apparent.

As seen most clearly in Figure 1, the outer casing 12 is connected to a source of steam through the supply line 148 which incorporates a bypass 150 around the control valve 152, the bypass also incorporating a control valve 154 and each provided with an actuating member 156 and 158 respectively. Also, the casing is provided with a water supply line 160 which is provided with two control valves 162 and 164, in the manner shown, these valves being provided with the actuating members 166 and 168 respectively. A further conduit 170 is connected to the main air supply line 172 and the line 170 is provided with a control valve 174 and associated actuator 176.

A timing or cam assembly indicated generally by the reference character 178 provides a portion of the control mechanism for the can retort assembly and incorporates essentially a motor 180 connected through a gear reduction unit 182 to a shaft 184 which may be selectively clutched as by the assembly 186 to the elongated shaft 188 carrying a plurality of cam discs 190 thereon in longitudinally spaced relation, as shown. The cam discs are so arranged, as will be presently apparent, to provide proper actuation of the various control valves 192. The motor 180 is provided with a manual control switch 194 and with an automatic control switch 196 having an actuating member 198 associated therewith. The motor may also be provided with a further control switch 200 associated with one of the cam discs.

A suitable chute or hopper mechanism 202 is connected to a suitable source of supply of canned goods to be cooked and a portion 204 of this chute is hinged in the manner shown as at 206 to operate between the full and dotted line position under control of the actuating member 208 such as to selectively allow the cans to roll by gravity down the discharge spout portion 210 which is in register with the top door opening of the retort assembly as will be readily apparent.

Temperature and pressure control mechanism 212 and 214 respectively are associated with the control mechanism of the retort assembly.

In operation of the retort assembly, the retort will be considered at the beginning of a cycle of operation wherein its bottom door assembly is in closed position as is the top door assembly. At this point, the manual control switch 194 for the motor 180 is actuated to start this motor for rotating the cam shaft 188. Immediately, the control valve specifically designated by the reference character 216 is operated to connect the air line 218 to the main supply line 172 such as to operate the actuating member 220 controlling the two position valve 222 whereby the lower of the supply lines 224 leading to the cylinder 60 is connected to the air supply forcing the piston member upwardly therein and opening the top door. Simultaneously, the actuating member 166 in the water line 160 is actuated through the valve member 226 to an open position allowing water to enter the retort, the valve 168 being normally open at this point. Also, the control line 228 is connected to the air supply line by the valve member 230, this control line leading to a normally closed valve member 232 associated with the upper of the ears 104 of the lower float valve assembly. Water continues flowing into the retort mechanism until it reaches a predetermined level such as to raise the lower float assembly actuating the valve 232 as well as the valve 234. Both valves 232 and 234 are normally closed and will be opened upon upward movement of the associated lower valve assembly such that the control line 228 is connected through the line 236 through a normally open valve member 238 and further through the line 240 to the actuating member 198 previously described which operates the switch 196 to shut off the cam motor 180. Also, the air entering the line 240 connects with the previously described actuating member 208 to open the member 204 and allow cans from the supply to run down through the chute 210 into the retort. The valve 234 is opened to connect a bleed line 242 to the conduit 244 connecting to the actuating member 168 to shut off the normally open valve 164 and cut off the supply of water entering through the conduit 160. The retort is substantially filled half way with water, which provides a cushion for the cans falling into the assembly. As the cans continue to fall, the level of the water will rise until it reaches such a point as to actuate the upper float valve assembly 94 which closes the normally open valve member 238 to shut off the line 240 and permit the cam motor 182 to operate once again as well as deactivate the actuating member 208 and permit the can control door 204 to raise to its normal shut-off position.

Upon reactivation of the cam shaft assembly 188, the valve 230 is actuated to close the control line 228 for a purpose which will be presently apparent and the cam also actuates the valve 226 to close the valve 162. Further, the previously described valve 260 is actuated to disconnect the line 218 from the pressure source and connect the line 246 thereto which will operate to move the actuator 220 such that the upper air line 248 leading to the cylinder 60 will be connected to the air supply for closing the top door assembly at this point. Simultaneously, the valve 250 will be actuated to connect the line 252 to the air source and control the actuator 158 to open the steam supply valve 154 permitting steam to enter the retort assembly. At this point also, the valve 254 is actuated to connect the previously mentioned fluid line 122 to the air supply and operate the actuator 118 for opening the trap valve 112, the trap valve 116 being also actuated at this time by the valve member 256. This opening of the valves 116 and 112 will permit the water within the retort to be drained outwardly through the conduit 108 and into the trap, the trap being suitably vented, whereupon the float 146 will rise to connect the line 138 to the air supply line 140 such that the piston rod member 258 is moved upwardly by the diaphragm member 134 to carry the valve 260 to the dotted line position shown and permit the water within the retort to drain outwardly through the drain line 128. When the retort is completely drained of water and only steam remains therein, the float 146 will have moved to the lower position, as shown in full lines in Figure 7 such as to connect the upper line 136 to the fluid motor 130 and urge the plunger 258 and valve 260 into engagement with the seat in the bushing 126, preventing escape of the steam from the retort.

All of the various control valves associated with the cam mechanism remain in the position described to this point for a predetermined period of time which is controlled in a manner hereinafter set forth during which time the live steam within the retort cooks the food material within the can therein. At the end of the cooking time, the valve 250 is manipulated to deactivate the actuating member 158 and shut off the supply of steam to the retort while the valves 254 and 256 simultaneously operate to close the drain valves 112 and 116. At this point also, the valve 226 is manipulated to connect the line 262 with the actuator 166 to once again introduce water into the retort to cool the cans therein. At this point also, the control valves 270 and 272 are operated to connect the lines 274 and 276 to the temperature and pressure control mechanisms 212 and 214 respectively. This will permit the lines 278 and 280 to be connected to the associated actuators 156 and 176 for controlling both the supply of steam and air into the retort for for maintaining the pressure within the retort to prevent buckling of the cans during the cooling operation. The temperature control member 212 is controlled by temperature control line 282 associated with the retort and the pressure control assembly 214 is connected to a connecting line 284 communicating with the interior of the retort, these control lines controlling cold air to the various lines 278 and 280.

After a predetermined length of time, the cam assembly will actuate the valves 270 and 272 to prevent any further introduction of air or steam into the retort and will further actuate the valve 226 to shut off the supply of water entering the retort. Thereafter, the valve 286 is manipulated to connect the control line 288 to the actuator 290 controlling the normally closed vent valve member 292 such that the pressure in the retort will be relieved at this time. Also, the main trap valves 112 and 116 will be reactivated through the valves 254 and 256 to allow water to drain outwardly from the can retort.

After a predetermined length of time, the valve 294, being normally in a position to connect the line 296 with the actuator 298 so that the line 300 associated with the cylinder assembly 66 will force the lower door to the closed position, will be manipulated such as to shut off the supply of air to the line 296 and connect the line 302 with the actuator 298 to thereby connect the cylinder line 304 with the air supply and open the bottom door, permitting the cans within the retort to fall outwardly therefrom by gravity into a suitable discharge chute or other mechanism. Simultaneously, the main trap valves 112 and 116 are closed by manipulation of the valve members 154 and 156 to their normal operative positions. Thereafter, the valve 286 is released to its normal position again closing the bottom door assembly and also the valve 256 is manipulated to close the vent assembly 292. This completes the cycle of operation with the exception that the switch 200 may be provided such as to at this point shut off the cam motor 180.

Referring now more particularly to Figures 8–15 wherein the details of the cam mechanism assembly is shown, it will be seen that the various valves 192 consist of outer sleeve members 308 provided with suitably spaced apertures 310 which are selectively communicable with apertures 312 on the core member 314.

The core or plungers take the form of enlarged body members 316 separated by the reduced portion 318 into which packing material is disposed to seal against the inner bore of the casing 308 to prevent leakage of fluid between the various apertures 310 and 312 which are adjacent to each other. A ball bearing member 320 may be provided between the cores and the inner ends of the bore of the casing in the manner shown to provide a sub-bearing surface. The opposite ends of the cores have the stem portions 320 of reduced diameter which cooperate with packing material 324 and a packing nut 326 engaged with the housing for effecting a final sealing of the valve assemblies. The housings are provided with threaded stud portions 328 or other suitable means of attachment. Secured to the free end of the housings 308 are stop assemblies indicated generally by the reference character 330 which incorporates clamping portions 332 for securement to the housings and intermediate web portions 334 terminating in the generally C-shaped stop portion 336 which may be provided with a series of circumferentially spaced apertures 338 into which the bracket members 340 are secured selectively. These bracket members carry the threaded members 342 having eyes 344 at their lower end for connection to the tension spring 346 connected at their opposite ends to the pins 348 carried by the trigger plate members 350. The trigger plates are provided with rearwardly extending ears 352 carrying adjustable stop nuts 354 for engagement with the opposite sides of the blades 356 which are rigidly secured to the stems 322 of the valve core, it being manifest that the trigger plates 350 are journaled on the free ends of the valve core stems 322. The disposition between the tension spring 346, the valve trigger plates 350 and the brackets 340 is such that the valve trigger plates will always return to a normal position under action of the tension springs.

The cam discs 190 are provided with a series of circumferentially spaced apertures 358 for selectively receiving various of the peg members 360 which are adapted to engage against the actuating blades 356 to move the plates 350 and consequently the valve cores such as to effectively align and misalign the various openings 310 and 312 for actuation of the various previously described fluid line. It will be manifest that the spacing between the apertures 358 is such that the pegs 360 may be removed or placed in the proper openings to obtain the desired timing operation of the various valve assemblies.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. In an automatic canned goods cooking apparatus, a retort, an upper canned goods inlet door, a lower canned goods outlet door, interlocked control means for retaining said lower door closed while said upper door is open and for retaining said upper door closed while said lower door is open, a steam inlet conduit, a water inlet conduit, an air inlet conduit, a steam valve in said steam conduit, an air valve in said air conduit, a water valve in said water conduit, a timer to automatically operate each of said valves, said timer including an electric motor, a manual control switch arranged to energize said motor, a cam shaft connected to said motor for rotation in response to actuation of said electric motor, a plurality of cams secured to said shaft and having adjustably mounted pins, each of said valves having valve actuating arms projected in the path of the pins of said cams, said interlocked controls for said retort doors being pneumatically operated and operatively connected to said air inlet conduit and said air valve, a trap valve to drain the retort, liquid level control means exposed to the liquid level in the retort for controlling said electric motor and including a float control switch operatively connected to said motor and located near the top of the retort whereby to operate the motor in order to actuate said trap valve to drain the retort and upon further rotation of said shaft to enable the pins of another of said cams to actuate said steam valve, and a manually overriding control switch operatively connected with said motor to provide for manual interruption of the automatic cycle at any point therein.

2. The automatic canned goods cooking apparatus of claim 1 wherein there is a pressure and temperature responsive mechanism for bleeding steam and air into the retort, said mechanism operatively connected to the steam and air conduits, and means operatively connected with and actuated by said timing device for controlling said mechanism.

References Cited in the file of this patent

UNITED STATES PATENTS

| | | |
|---|---|---|
| 138,580 | Pigot | May 6, 1873 |
| 908,278 | Koch | Dec. 29, 1908 |
| 960,857 | Eggert | June 7, 1910 |
| 1,238,225 | Walker | Aug. 28, 1917 |
| 1,382,148 | Walker | June 21, 1921 |
| 1,506,712 | McAllen | Aug. 26, 1924 |
| 1,627,770 | Durkee | May 10, 1927 |
| 2,014,325 | Grilli | Sept. 10, 1935 |
| 2,295,920 | Vermillion | Sept. 15, 1942 |
| 2,392,197 | Smith et al. | Jan. 1, 1946 |
| 2,468,794 | Wilbur | May 3, 1949 |
| 2,472,970 | Hanna | June 14, 1949 |
| 2,515,137 | Schall et al. | July 11, 1950 |
| 2,538,980 | Payne | Jan. 23, 1951 |
| 2,578,179 | Doyle | Dec. 11, 1951 |
| 2,605,969 | Sanders | Aug. 5, 1952 |
| 2,649,380 | Flynn | Aug. 18, 1953 |